April 14, 1942.      H. L. WILENSKY      2,279,355

TOOTH CLEANING AND GUM MASSAGING BRUSH

Filed March 28, 1940

INVENTOR
Harry L. Wilensky
BY
ATTORNEY

Patented Apr. 14, 1942

2,279,355

UNITED STATES PATENT OFFICE 2,279,355

TOOTH CLEANING AND GUM MASSAGING BRUSH

Harry L. Wilensky, New York, N. Y.

Application March 28, 1940, Serial No. 326,321

2 Claims. (Cl. 15—110)

This invention relates to new and useful improvements in a tooth cleaning and gum massaging brush.

Still further the invention proposes the construction of a tooth cleaning and gum massaging brush characterized by a rubber brush body having a plurality of solid or metal impregnated pointed rubber elements and cylindrical rubber elements projecting therefrom in a specific relationship to each other to permit the pointed elements to be used for cleaning the crevises between the teeth, and the cylindrical rubber elements for massaging the gums.

Still further the invention proposes the provision of a solid member secured within the rubber brush body and forming a projecting handle, so that the said solid member imparts rigidity to the body, and provides a handle to permit the device to be used in a manner of conventional tooth brushes.

A further object of this invention proposes the provision of hollowed out or cup-shaped outer ends upon the solid cylindrical rubber elements to add to the massaging effect thereof when brought in contact with one's gums, and to sooth the gums by the vacuum action of the cup, also to serve as a cup or compartment for the cleaning ingredients.

Still further the invention proposes the provision of a means for interchangingly holding in position the pointed elements projected outwards from the brush body.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
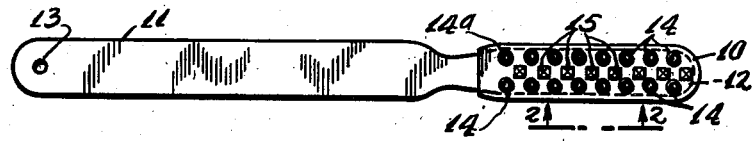
Fig. 1 is an elevational view of a tooth cleaning and gum massaging brush constructed according to this invention.
Figure 2:
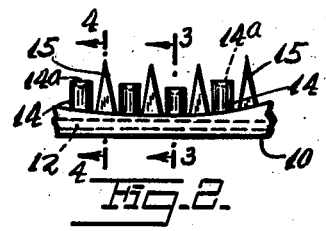
Fig. 2 is a partial side elevational view on the line 2—2 of Fig. 1.

The tooth cleaning and gum massaging brush, according to this invention, includes a rubber brush body 10 having a concaved top face and a handle 11 continuing from one end thereof. The brush body 10 is constructed of soft rubber and has a solid tongue 12 embedded therein and extending along the entire length thereof for imparting rigidity to the brush body. This tongue is made of suitable plastic or metal material and has a continuation portion forming the handle 11 for permitting the same to be used similar to conventional tooth brushes. The free end of the handle 11 is provided with an opening 13 by which the brush may be conveniently suspended from a wall or similar surface.

A plurality of solid cylindrical rubber elements project from the concaved top face of the brush body 10. These cylindrical rubber elements are integrally formed with the brush body 10 and extend in spaced lines along the adjacent edges thereof. Each of the cylindrical rubber elements 14 is characterized by a hollowed out outer end 14a for facilitating the massaging and soothing action when the ends of the cylindrical rubber elements are brought into contact with one's gums, and will help to carry the cleaning ingredients to the teeth.

Figure 3:
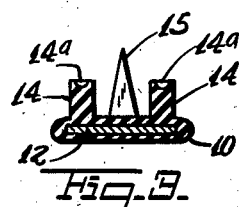
Fig. 3 is an enlarged vertical sectional view on the line 3—3 of Fig. 2.
Figure 6:
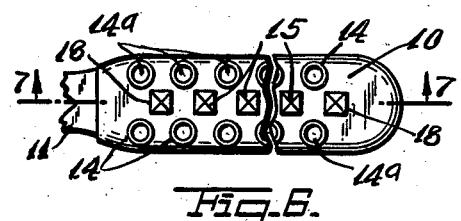
Fig. 6 is a view similar to Fig. 5 but illustrating a still further modification of the invention.
Figure 4:
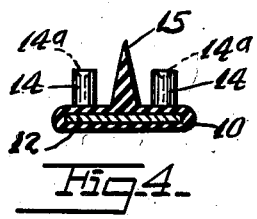
Fig. 4 is an enlarged vertical sectional view on the line 4—4 of Fig. 2.
Figure 7:
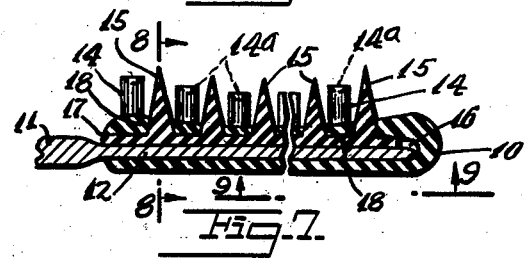
Fig. 7 is a vertical sectional view on the line 7—7 of Fig. 6.
Figure 9:
Fig. 9 is a bottom elevational view looking in the direction of the line 9—9 of Fig. 7.
Figure 8:
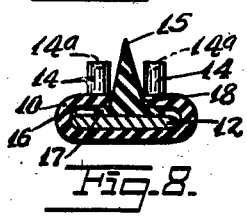
Fig. 8 is a vertical sectional view on the line 8—8 of Fig. 7.

A plurality of solid pointed rubber elements 15 project from the concaved top face of the brush body 10. The pointed rubber elements 15 may be integrally formed with the brush body 10 and are arranged in a line extending parallel to the lines of cylindrical rubber elements 14 and are disposed therebetween as shown in Figs. 1, 3 and 4. These pointed rubber elements 15 project beyond the free ends of the cylindrical rubber elements 14 and are provided for the purpose of permitting the crevices between one's teeth to be conveniently cleaned.

The cylindrical rubber elements 14 and the pointed rubber 15 are all of the same length and due to the fact that they extend from the concaved face their outer ends are located in a concaved plane to more accurately seat against one's curved gums and teeth.

Figure 5:
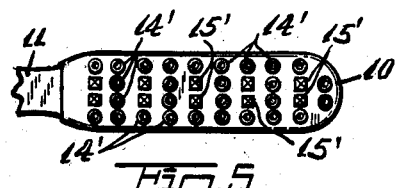
Fig. 5 is a view similar to a portion of Fig. 1 but illustrating a modification of the invention.

According to the modification of the invention shown in Fig. 5 the construction of the tooth cleaning and gum massaging brush is similar to that previously described, except for a slightly different arrangement of the cylindrical rubber elements 14' and the pointed rubber elements 15'.

The cylindrical rubber elements are arranged in parallel rows adjacent the side edges of the rubber brush body 10. The center of the brush body 10 between the cylindrical rubber elements 14' is provided with a double row of alternately arranged solid rubber elements 14' and pointed rubber elements 15'. In other respects this form of the invention is similar to the previous form.

According to the modification of the invention shown in Figs. 6-9 inclusive the construction of the tooth brush is similar to that shown in Fig. 1 except for the provision of a means for removably holding a portion of the brush body with the pointed elements 15 in position with relation to the brush body. In this form of the invention the tongue 12 of the handle 11 extends into a hollowed out area 16 formed in the brush body and securely holds in position the removable and interchangeable pointed members 15. These pointed members are integral with a base strip 17 which is located between the top wall of the hollowed out area 16, and the top face of the tongue 12, and is confined to a position immediately below the row of cylindrical rubber elements 14 by the tongue 12.

The pointed rubber members 15 are adapted to project through rectangular openings 18 formed in the upper surface of the brush body 10. This arrangement permits the interchanging of the pointed elements in the tooth cleaning and massaging brush with differently shaped pointed members of various sizes and density to obtain the most effective results in massaging, soothing and cleaning one's teeth.

The base strip 17 with the pointed members 15 may be easily removed from the brush body 10 by first removing the handle 11 so that the tongue portion 12 is withdrawn from the hollow 16 of the brush body. The base strip 17 may then be moved downwards, and the side portions of the brush body 10 may be pressed inwards so as to increase the height of the hollow of the brush body, facilitating the top extremities of the pointed members 15 passing out of the openings in the brush body 10. Attention is called particularly to Figs. 8 and 9 wherein the strip 17 is clearly illustrated of a much lesser width than the width of the hollow of the brush body 10. The tongue 12 is illustrated substantially as of the same width as the hollow of the brush body so that when it is in position, the base strip 17 is firmly held in position with its pointed members 15 projecting out from the top side of the rubber body 10.

It is to be understood that the shape and material of the tooth cleaning and gum massaging brush may be changed as desired. The device may also be molded or otherwise produced in various colors.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a tooth cleansing and gum massaging brush having a hollow rubber brush body with massaging elements projecting upwardly from the upper wall thereof and being open at one end, said upper wall having openings therethrough, a strip within the hollow of said brush body and having teeth cleaning members thereon projecting through said openings, and a handle having a tongue on one end thereof, said tongue extending within the hollow of said brush body and bearing between said strip and the lower wall of said hollow brush body for holding said strip in position, said tongue being removable by sliding from said open end of said brush body to free said strip.

2. In a tooth cleansing and gum massaging brush having a hollow rubber brush body with massaging elements projecting upwardly from the upper wall thereof and being opened at one end, said upper wall having openings therethrough, a strip within the hollow of said brush body and having teeth cleaning members thereon and projecting through said openings, and a handle having a tongue on one end thereof, said tongue extending within the hollow of said brush body and bearing between said strip and the lower wall of said hollow brush body for holding said strip in position, and said tongue being removable by sliding from said open end of said brush body to free said strip, said tongue being of a width substantially equal to the width of the hollow of said brush body and said strip being of a width which is much narrower than the width of the hollow of said brush body.

HARRY L. WILENSKY.